United States Patent
Zink et al.

(10) Patent No.: US 9,512,909 B2
(45) Date of Patent: Dec. 6, 2016

(54) ACTUATOR ASSEMBLY FOR TRANSLATING A MOVABLE ELEMENT OF A DRIVELINE COMPONENT

(71) Applicant: American Axle & Manufacturing, Inc., Detroit, MI (US)

(72) Inventors: Frederick E. Zink, Capac, MI (US); Brian A. Calomeni, Shelby Township, MI (US); Peyman Moradshahi, Rochester Hills, MI (US); Robert D. Hopp, Almont, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 15/135,590

(22) Filed: Apr. 22, 2016

(65) Prior Publication Data

US 2016/0312866 A1    Oct. 27, 2016

Related U.S. Application Data

(60) Provisional application No. 62/151,782, filed on Apr. 23, 2015.

(51) Int. Cl.
*F16H 25/18* (2006.01)
*F16H 63/04* (2006.01)
*F16H 63/32* (2006.01)

(52) U.S. Cl.
CPC ............. *F16H 25/186* (2013.01); *F16H 63/04* (2013.01); *F16H 63/32* (2013.01)

(58) Field of Classification Search
CPC .......... F16H 63/02; F16H 63/04; F16H 63/24; F16H 63/304; F16H 2063/3056; F16H 2063/321; F16H 25/02; F16H 25/183; F16H 25/186; F16H 25/08; F16H 63/18

(Continued)

(56) References Cited

U.S. PATENT DOCUMENTS 4,853,629 A    8/1989  Rops
5,334,096 A    8/1994  Iwao
(Continued)

FOREIGN PATENT DOCUMENTS

JP    S6446045 A        2/1989
JP    05118440 A   *   5/1993

OTHER PUBLICATIONS

PCT International Search Report dated Apr. 27, 2016.

*Primary Examiner* — David M Fenstermacher
*Assistant Examiner* — Bobby Rushing, Jr.
(74) *Attorney, Agent, or Firm* — Harness, Dickey & Pierce, P.L.C.

(57) ABSTRACT

An actuator assembly with first and second sleeves, a barrel, a follower, a groove, a spring, and an output member that is coupled to the second sleeve. The first sleeve has a first externally toothed body, a first flange, which extends radially outwardly from the first body, and a first bore. The barrel is received in the first bore and is rotatable therein. The follower is fixed to one of the barrel and the first sleeve and is received in the groove, which is formed in the other one of the barrel and the first sleeve. The second sleeve has a second body with an internally toothed second bore. The second sleeve is disposed about the first sleeve such that internal and external teeth are meshed to axially slidably but non-rotatably couple the first and second sleeves. The spring is disposed between the first flange and the second sleeve.

15 Claims, 4 Drawing Sheets

(58) Field of Classification Search
USPC .............................. 74/337.5, 473.12, 473.36
See application file for complete search history.

(56) References Cited

U.S. PATENT DOCUMENTS

| | | |
|---|---|---|
| 5,743,143 A | 4/1998 | Carpenter et al. |
| 5,867,092 A | 2/1999 | Vogt |
| 5,890,986 A | 4/1999 | Pritchard et al. |
| 6,230,577 B1 | 5/2001 | Showalter et al. |
| 6,382,040 B1 | 5/2002 | Diangelo et al. |
| 6,619,153 B2 | 9/2003 | Smith et al. |
| 7,399,251 B2 * | 7/2008 | Mueller ............. B60K 17/3467 475/204 |
| 7,694,598 B2 * | 4/2010 | Kriebernegg ........... F16H 61/32 192/48.2 |
| 7,717,437 B2 | 5/2010 | Adams, III et al. |
| 8,037,779 B2 | 10/2011 | Shiozaki et al. |
| 8,156,837 B2 | 4/2012 | Smith |
| 8,258,779 B2 | 9/2012 | Wenzel et al. |
| 8,726,749 B2 | 5/2014 | Hirsch et al. |
| 9,151,368 B2 | 10/2015 | Downs et al. |
| 2002/0125094 A1 | 9/2002 | Zimmermann et al. |
| 2008/0210034 A1 | 9/2008 | Murakami et al. |
| 2011/0100144 A1 | 5/2011 | Neelakantan et al. |
| 2011/0152026 A1 | 6/2011 | Williams |
| 2012/0017716 A1 | 1/2012 | Neelakantan et al. |
| 2013/0019705 A1 | 1/2013 | Pregnolato et al. |
| 2015/0053027 A1 | 2/2015 | Downs |

\* cited by examiner

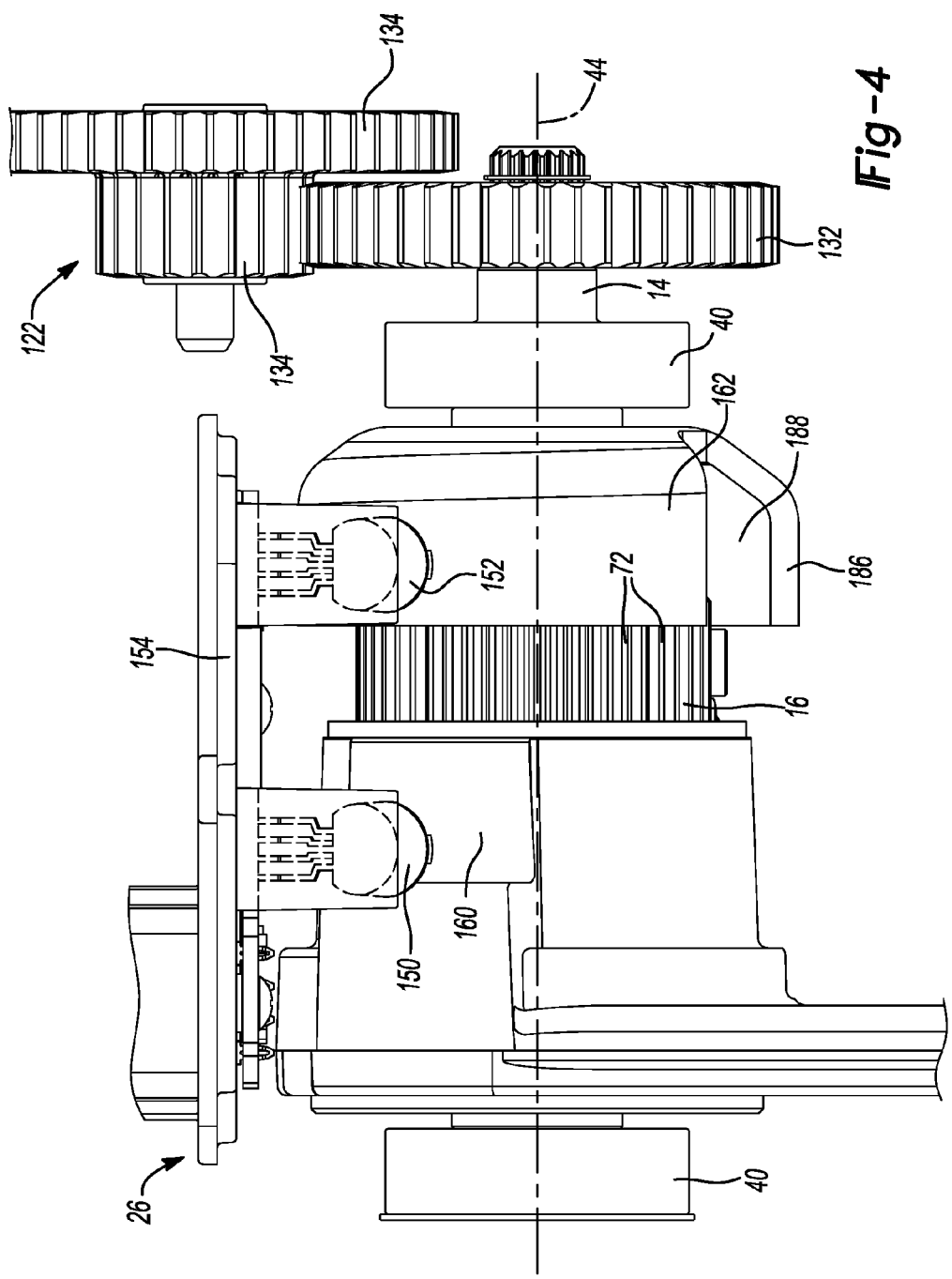

ACTUATOR ASSEMBLY FOR TRANSLATING A MOVABLE ELEMENT OF A DRIVELINE COMPONENT

CROSS-REFERENCE TO RELATED APPLICATIONS

This application claims the benefit of U.S. Provisional Application No. 62/151,782, filed on Apr. 23, 2015, the disclosure of which is incorporated by reference as if fully set forth in detail herein.

FIELD

The present disclosure relates to an actuator assembly for translating a movable element of a driveline component.

BACKGROUND

Various actuators are known in the driveline art for selectively translating an element of a driveline component to cause the driveline component to operate in a different mode or condition. The element could be a part of a coupling that is employed to selectively transmit rotary power through the driveline component. The coupling could be a dog or collar that is selectively translated into and out of engagement with another dog or a splined shaft. Alternatively, the element could be part of a transmission within the driveline component that is employed to selectively operate the driveline component in two or more speed ratios. As further alternative, the element could be part of a locking mechanism that is selectively engageable to inhibit relative rotation between a pair of torque transmitting elements in the driveline component.

One such actuator is described in U.S. Patent Application Publication No. 2015/0053027 and is employed in a disconnectable, two-speed power take-off unit (PTU) to control engagement of a pair of elements in the PTU that control power transmission through the PTU and a gear reduction within the PTU. While such actuator is satisfactory for its intended purpose, such actuators are nevertheless susceptible to improvement.

SUMMARY

This section provides a general summary of the disclosure, and is not a comprehensive disclosure of its full scope or all of its features.

In one form, the present teachings provide an actuator assembly for selectively operating a component of a driveline. The actuator assembly includes a first sleeve, a barrel, a cam follower, a cam groove, a second sleeve, a first spring, and an actuator output member. The first sleeve has a first sleeve body, a first flange and a first internal bore that is disposed about an actuation axis. The first sleeve body has a plurality of external teeth. The first flange extends radially outwardly from the first sleeve body. The barrel is received in the first internal bore and is rotatable about actuation axis. The cam follower is fixedly coupled to one of the barrel and the first sleeve. The cam follower is received in a cam groove formed in the other one of the barrel and the first sleeve. The second sleeve has a second sleeve body that defines a second internal bore having a plurality of internal teeth formed thereon. The second sleeve is disposed about the first sleeve such that the internal teeth are meshed with the external teeth to thereby axially slidably but non-rotatably couple the second sleeve to the first sleeve. The first spring is disposed between the first flange and the second sleeve. The actuator output member is coupled to the second sleeve for movement therewith along the actuation axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an elevation view of a portion of the actuator assembly of FIG. 1.

Corresponding reference numerals indicate corresponding parts throughout the several views of the drawings.

DETAILED DESCRIPTION

Figure 1:
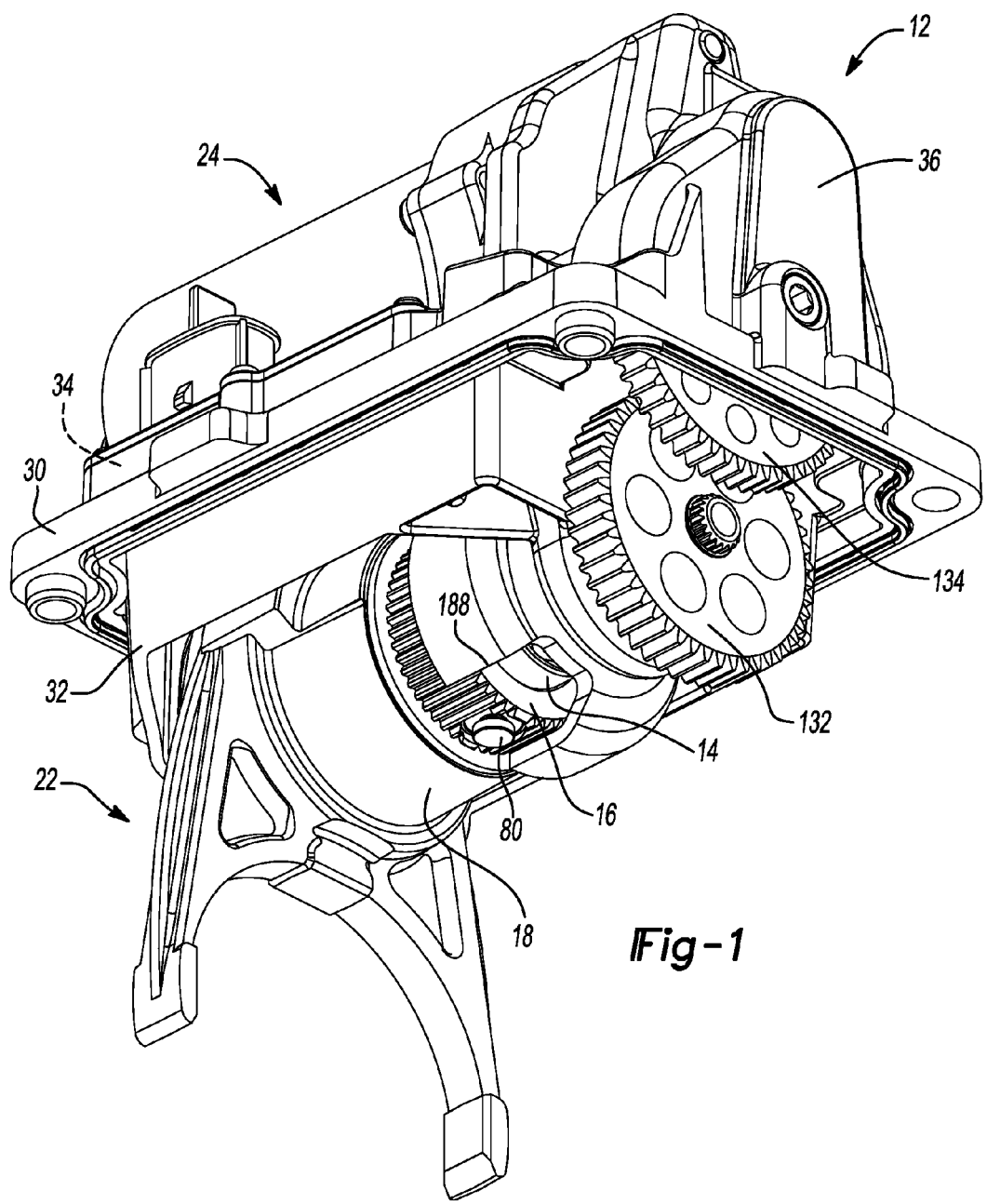
FIG. 1 is a perspective view of an actuator assembly constructed in accordance with the teachings of the present disclosure.
Figure 2:
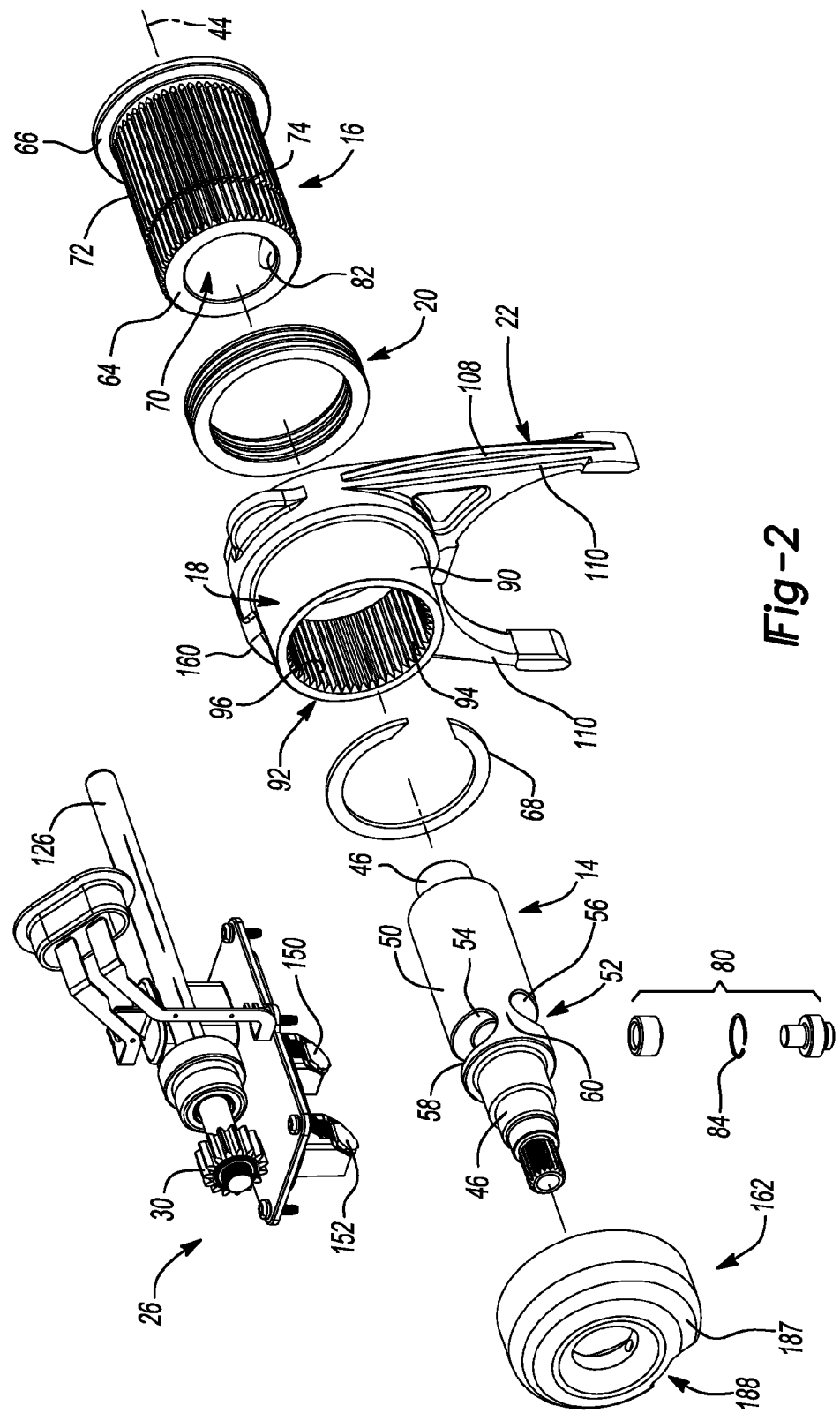
FIG. 2 is an exploded perspective view of the actuator assembly of FIG. 1.

With reference to FIGS. 1 and 2, an actuator assembly constructed in accordance with the teachings of the present disclosure is generally indicated by reference numeral 10. The actuator assembly 10 can include a housing assembly 12, a barrel 14, a first sleeve 16, a second sleeve 18, a spring 20, an actuator output member 22, a rotary power source 24 and a control unit 26.

Figure 3:
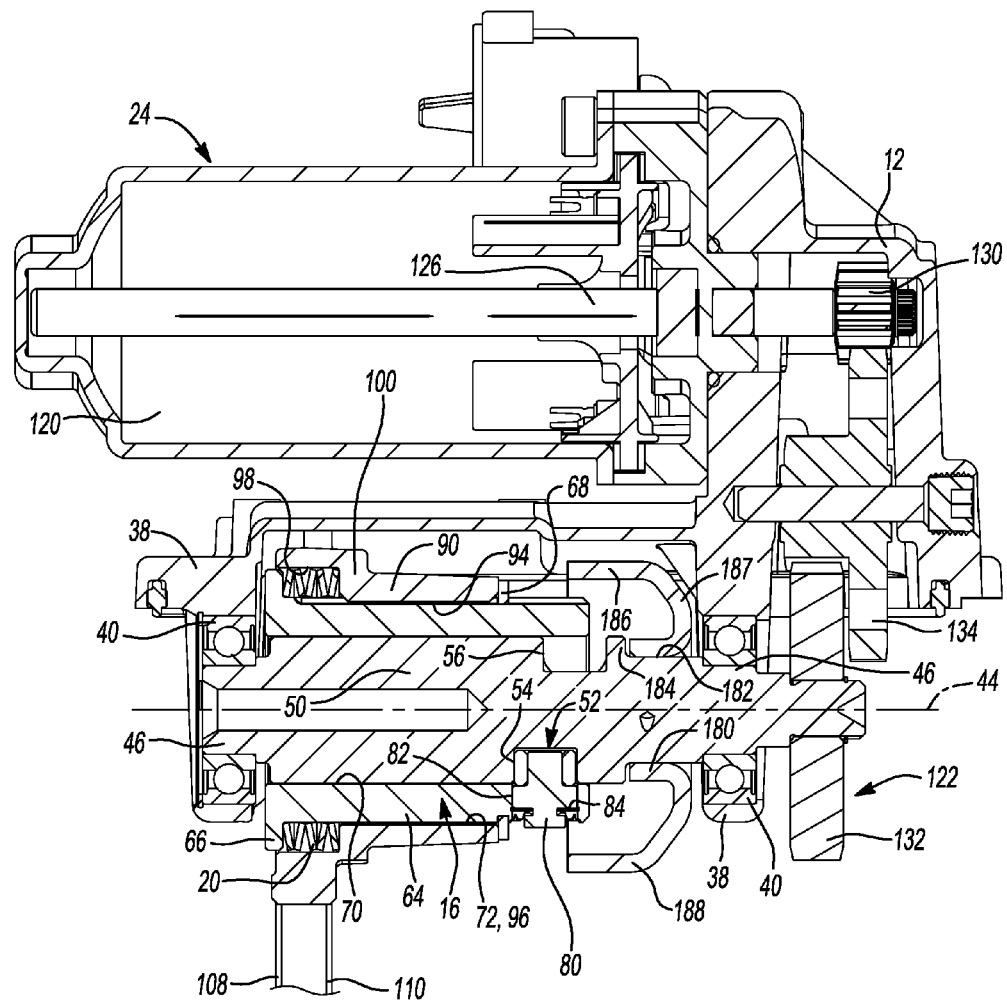
FIG. 3 is a section view taken through the actuator assembly of FIG. 1 along an actuation axis.

With reference to FIGS. 1 and 3, the housing assembly 12 can comprise first and second housing members 30 and 32, respectively, that can cooperate to form a closed housing cavity 34, a motor and transmission mount 36 and a pair of bearing mounts 38. The first and second housing members 30 and 32 can be formed of any desired material, such as a reinforced plastic material or a light weight, for example magnesium or aluminum. If desired, one or more gaskets (not specifically shown) can be disposed between the first and second housing members 30 and 32 to form a seal therebetween. A bearing 40 can be disposed in each of the bearing mounts 38.

In FIGS. 2 through 4, the barrel 14 can be supported for rotation relative to the housing assembly 12 about an actuation axis 44. In the example provided, the barrel 14 includes a pair of necked down segments 46 that are mounted in the bearings 40 so that the bearings 40 directly support the barrel 14 for rotation relative to the housing assembly 12. The barrel 14 can have a central section 50 into which a circumferentially extending cam groove 52 can be formed. In the example provided, the actuator assembly 10 is configured to move the actuator output member 22 between two distinct positions (i.e., a first output member position and a second output member position) and as such, the cam groove 52 has a first and second groove portions 54 and 56, respectively, that are connected by a transition portion 58. The first and second groove portions 54 and 56 are spaced apart from one another along the actuation axis 44 and extend circumferentially about a portion of the central section 50, while the transition portion 58 extends in a helical manner to connect the first and second groove portions 54 and 56. In the example provided, a wall member 60 is disposed circumferentially between the first and second groove portions 54 and 56 on a side opposite the transition portion 58 so that the cam groove 52 does not extend fully about the circumference of the central section 50. It will be appreciated, however, that a second transition portion (not shown) could be employed to connect the first and second groove portions 54 and 56 so that the cam groove 52 extends fully about the circumference of the central section 50. The second transition portion could extend helically about a portion of the circumference of the central section 50 in a manner that is opposite to that of the transition portion 58. It will also be appreciated that if the actuator output member 22 of the actuator assembly 10 were to have more than two distinct positions, the cam groove 52 could be configured with a corresponding number of circumferentially extending groove portions and that helically configured transition portions could be employed to link adjacent ones of the circumferentially extending groove portions to one another.

In FIGS. 2 and 3, the first sleeve 16 can have a first sleeve body 64, a first flange 66, a second flange 68, and a first internal bore 70. The first sleeve body 64 can have a plurality of external splines or teeth 72 that can be disposed concentrically about the actuation axis 44. The first and second flanges 66 and 68 can be spaced axially apart from one another along the actuation axis 44 and can extend radially outwardly from the first sleeve body 64. The first flange 66 can be unitarily and integrally formed with the first sleeve body 64, while the second flange 68 can be removably coupled to the first sleeve body 64. In the particular example provided, the second flange 68 is a snap ring that is received into a groove 74 that is formed in the first sleeve body 64. The first internal bore 70 is formed longitudinally through the first sleeve 16 and is aligned to the actuation axis 44. The barrel 14 is received in the first internal bore 70 and is rotatable relative to the first sleeve 16. A cam follower 80 can be coupled to the first sleeve 16 and can be received in the cam groove 52. In the example provided, a follower bore 82 formed in the first sleeve body 64 and intersects the first internal bore 70, and the cam follower 80 is received into the follower bore 82. Any desired means may be employed to retain the cam follower 80 to the first sleeve 16, such as a retaining ring 84.

While the cam groove 52 has been described as being formed in the barrel 14 and the cam follower 80 has been described as being mounted to the first sleeve 16, it will be appreciated that in the alternative, the cam groove 52 could be formed in the first sleeve 16 and that the cam follower 80 could be coupled to the barrel 14 for rotation therewith.

The second sleeve 18 can have a second sleeve body 90 that can define a second internal bore 92. The second internal bore 92 can have a first portion 94 on which a plurality of internal teeth 96 can be formed, and a second portion 98 that can be relatively larger in diameter than the first portion 94. The second sleeve 18 can be disposed about the first sleeve 16 axially between the first and second flanges 66 and 68 such that the internal teeth 96 are meshed with the external teeth 72 to thereby axially slidably but non-rotatably couple the second sleeve 18 to the first sleeve 16.

The spring 20 can be received between the first and second sleeves 16 and 18 and can bias the second sleeve 18 in a predetermined axial direction relative to the first sleeve 16. In the example provided, the spring 20 is received about the first sleeve body 64, a first axial end of the spring 20 is abutted against the first flange 66, the spring 20 is received in the second portion 98 of the second internal bore 92 and is abutted against a circumferentially extending shoulder 100 formed on the second sleeve body 90 where the first and second portions 94 and 98 of the second internal bore 92 intersect. As will be apparent from the discussion below, the spring 20 provides a modicum of compliance to the actuator assembly 10 that permits the barrel 14 to be rotated about the actuation axis 44 and the first sleeve 16 to be translated along the actuation axis 44 in the predetermined axial direction in situations where the second sleeve 18 (and the actuator output member 22) are not able to correspondingly translate along the actuation axis 44 in the predetermined axial direction.

Optionally, a second spring (not shown) can be employed to bias the second sleeve 18 relative to the first sleeve 16 in an axial direction opposite the predetermined axial direction. For example, the second spring could be disposed about the first sleeve body 64 and located axially between the second flange 68 and an axial end of the second sleeve body 90. The second spring 20 could be employed to provide a modicum of compliance to the actuator assembly 10 that permits the barrel 14 to be rotated about the actuation axis 44 and the first sleeve 16 to be translated along the actuation axis 44 in the direction opposite the predetermined axial direction in situations where the second sleeve 18 (and the actuator output member 22) are not able to correspondingly translate along the actuation axis 44 in direction opposite the predetermined axial direction.

The actuator output member 22 can be any type of structure that is configured to transmit motion of the second sleeve 18 along the actuation axis 44 to a movable element (not shown) of a driveline component (not shown). In the particular example provided, the actuator output member 22 includes a fork 108 that is fixedly coupled to the second sleeve 18 and has a pair of arms 110 that are configured to be received into a circumferential groove (not shown) in the movable element. The fork 108 can be integrally and unitarily formed with the second sleeve 18.

In FIGS. 2 through 4, the rotary power source 24 is configured to provide rotary power to the barrel 14 to rotate the barrel 14 about the actuation axis 44. The rotary power source 24 could comprise an electric motor having an output shaft that is coupled to the barrel 14 for common rotation. In the particular example provided, however, the rotary power source 24 comprises a rotary motor 120 and a transmission 122. The rotary motor 120 can be any type of motor, such as an electric motor, and can have a stator, which can be fixedly coupled to the housing assembly 12, and a rotor that drives a motor output shaft 126. The transmission 122 can include an input gear 130, which can be coupled to the motor output shaft 126 for rotation therewith, an output gear 132, which can be coupled to the barrel 14 for common rotation, and one or more intermediate gears 134 that transmit rotary power between the input gear 130 and the output gear 132.

In FIGS. 2 and 4, the control unit 26 can be configured to determine a rotational position of the barrel 14, an axial position of the actuator output member 22 and to control operation of the rotary power source 24 to selectively position the actuator output member 22 in a desired position along the actuation axis 44. The control unit 26 can include a first sensor 150, a second sensor 152 and a controller 154, all of which can be received in the closed housing cavity 34 in the housing assembly 12. The first and second sensors 150 and 152 can be configured to sense first and second sensor targets 160 and 162, respectively, and responsively generate an associated sensor signals. The first and second sensor targets 160 and 162 can be located in positions that are outside the closed housing cavity 34. The controller 154 is configured to receive the first and second sensor signals and an externally-generated shift command and to responsively control the rotary power source 24.

The first sensor target 160 can be coupled to the second sleeve for translation therewith along the actuation axis 44. The first sensor 150 is configured to sense the first sensor target 160 when the second sleeve 18 is in at least one position along the actuation axis relative to the barrel 14 and to responsively generate a first sensor signal. In the example provided, the first sensor target 160 is a tab-like structure that is coupled to (e.g., integrally and unitarily formed with) the second sleeve 18. In the example provided, the first sensor 150 is a Hall-effect sensor.

In FIGS. 3 and 4, the second sensor target 162 can be formed of a sheet steel or powdered metal material and can be coupled to the barrel 14 for rotation therewith. The second sensor 152 is configured to sense the second sensor target 162 when the second sensor target 162 (and thereby the barrel 14) is in at least one predetermined rotational position relative to the second sensor and to responsively generate a second sensor signal. In the particular example provided, the second sensor 152 is a Hall-effect sensor and the second sensor target 162 has an inner annular collar 180, which is fit to a cylindrical segment 182 of the barrel 14 and abutted against a shoulder 184 on the barrel 14, an outer annular collar 186 that is disposed concentrically about the inner annular collar 180, and a radially extending segment 187 that couples the inner and outer annular collars 180 and 186. A notch 188 (best shown in FIG. 1) can be formed in the outer annular collar 186 and can be oriented rotationally to a corresponding rotational orientation of the barrel 14.

The barrel 14 can be positioned rotationally relative to the first sleeve 16 such that the cam follower 80 is positioned in the first groove portion 54 so that the first sleeve 16 is positioned as shown in FIG. 3. In this position, the second flange 68 is abutted against the axial end of the second sleeve 18, while the first flange 66 is spaced axially apart from the circumferentially extending shoulder 100 and as such, the actuator output member 22 is in the first output member position.

In response to receipt of the externally-generated shift command, the controller 154 can operate the rotary power source 24 to rotate the barrel 14 in a first rotational direction to move the actuator output member 22 in a first axial direction toward the second output member position. The controller 154 can receive the second sensor signal to determine when the cam follower 80 is positioned in the second groove portion 56 and can halt the operation of the rotary power source 24. The controller 154 can determine if the actuator output member 22 has been positioned in the second output member position based on the first sensor signal.

In a situation where movement of the actuator output member 22 is prevented from moving in the first axial direction into the second output member position (e.g., due to tooth-on-tooth contact between the movable element of the driveline component and the element to which the moveable element is to engage), movement of the second sleeve 18 in the first axial direction along the actuation axis 44 will halt while the barrel 14 rotates in the first rotational direction. Further movement of the first sleeve 16 in the first axial direction along the actuation axis 44 will compress the spring 20 between the first flange 66 and the circumferentially extending shoulder 100 to thereby apply a biasing force to the second sleeve 18. When the actuator output member 22 is able to move in the first axial direction toward the second output member position, the load applied by the spring 20 onto the second sleeve 18 will cause the second sleeve 18 to move in the first axial direction along the actuation axis 44 to position the actuator output member 22 in the second output member position.

In response to receipt of another externally-generated shift command, the controller 154 can operate the rotary power source 24 to rotate the barrel 14 in a second rotational direction opposite the first rotational direction to move the actuator output member 22 in second axial direction that is opposite the first axial direction toward the first output member position. The controller 154 can receive the second sensor signal to determine when the cam follower 80 is positioned in the first groove portion 54 and can halt the operation of the rotary power source 24. Rotation of the barrel 14 in the second rotational direction can drive the first sleeve 16 to the left in FIG. 3 and contact between the second flange 68 and the axial end of the second sleeve 18 will cause the second sleeve 18 (and the actuator output member 22) to travel in the second axial direction with the first sleeve 16.

If desired, the first sleeve 16 can be received in the second sensor target 162 (e.g., between the inner and outer annular collars 180 and 186) when the actuator output member 22 is in at least one of the first and second output member positions. Construction in this manner can help to reduce the overall size of the actuator assembly 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator assembly for selectively operating a component of a driveline, the actuator assembly comprising:
    a first sleeve having a first sleeve body, a first flange and a first internal bore that is disposed about an actuation axis, the first sleeve body having a plurality of external teeth, the first flange extending radially outwardly from the first sleeve body;
    a barrel received in the first internal bore and rotatable about actuation axis;
    a cam follower fixedly coupled to one of the barrel and the first sleeve, the cam follower being received in a cam groove formed in the other one of the barrel and the first sleeve;
    a second sleeve having a second sleeve body, the second sleeve body defining a second internal bore having a plurality of internal teeth formed thereon, the second sleeve being disposed about the first sleeve such that the internal teeth are meshed with the external teeth to thereby axially slidably but non-rotatably couple the second sleeve to the first sleeve;
    a first spring disposed between the first flange and the second sleeve; and
    an actuator output member coupled to the second sleeve for movement therewith along the actuation axis.

2. The actuator assembly of claim 1, wherein the first spring is received in the second internal bore and is abutted against an internal circumferentially extending shoulder formed on the second sleeve body.

3. The actuator assembly of claim 1, wherein the first sleeve has a second flange that is coupled to the first sleeve body, wherein the second sleeve is disposed between the first and second flanges.

4. The actuator assembly of claim 3, wherein at least one of the first and second flanges is a snap ring that is assembled to the first sleeve body.

5. The actuator assembly of claim 3, further comprising a second spring that is received between the second flange and the second sleeve.

6. The actuator assembly of claim 1, further comprising a housing and a pair of bearings, the bearings supporting the barrel for rotation relative to the housing.

7. The actuator assembly of claim 6, wherein the bearings are mounted directly to the barrel.

8. The actuator assembly of claim 1, wherein the actuator output member comprises a fork having a pair of arms.

9. The actuator assembly of claim 1, further comprising a first sensor target and a first sensor, the first sensor target being coupled to the second sleeve for translation therewith along the actuation axis, the first sensor being configured to sense the first sensor target when the second sleeve is in at least one position along the actuation axis relative to the barrel and to responsively generate a first sensor signal.

10. The actuator assembly of claim 9, further comprising a second sensor target and a second sensor, the second sensor target being coupled to the barrel for rotation therewith, the second sensor being configured to sense the second sensor target when the second sensor target is in at least one predetermined rotational position relative to the second sensor target and to responsively generate a second sensor signal.

11. The actuator assembly of claim 9, further comprising a housing assembly that defines a closed housing cavity in which the first and second sensors are received, and wherein the first and second sensor targets are disposed outside of the closed housing cavity.

12. The actuator assembly of claim 1, wherein the cam groove has circumferentially spaced apart ends having a wall member disposed therebetween.

13. The actuator assembly of claim 1, further comprising a sensor target that is coupled to the barrel for rotation therewith, wherein the first sleeve is movable along the actuation axis between a first position and second position, and wherein the first sleeve is received in the sensor target when the first sleeve is in at least one of the first and second positions.

14. The actuator assembly of claim 1, further comprising an electric motor that is configured to provide a source of rotary power for rotating the barrel about the actuation axis.

15. The actuator assembly of claim 14, wherein the electric motor is coupled to the cam barrel through a transmission.

* * * * *